United States Patent Office 2,975,308
Patented Mar. 14, 1961

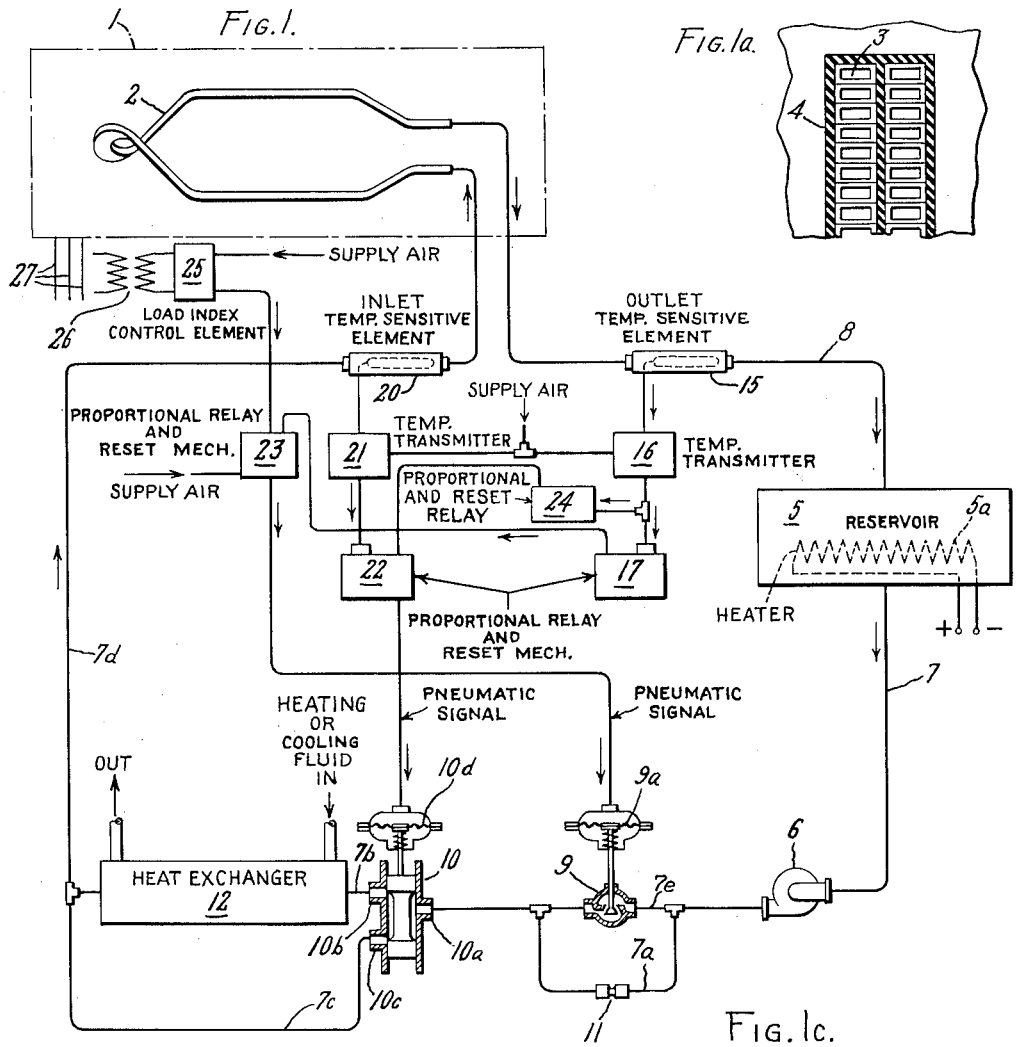
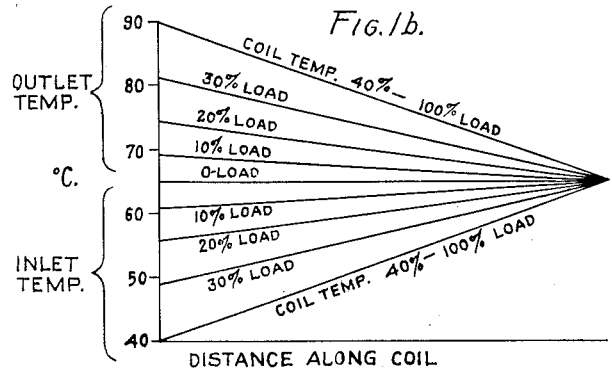
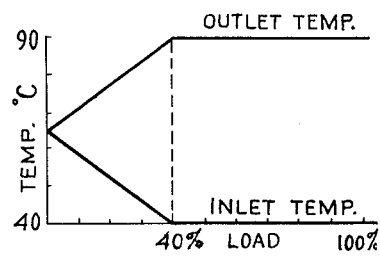
INVENTORS
CHARLES E. KILBOURNE
LLOYD P. GROBEL
BY
THEIR ATTORNEY

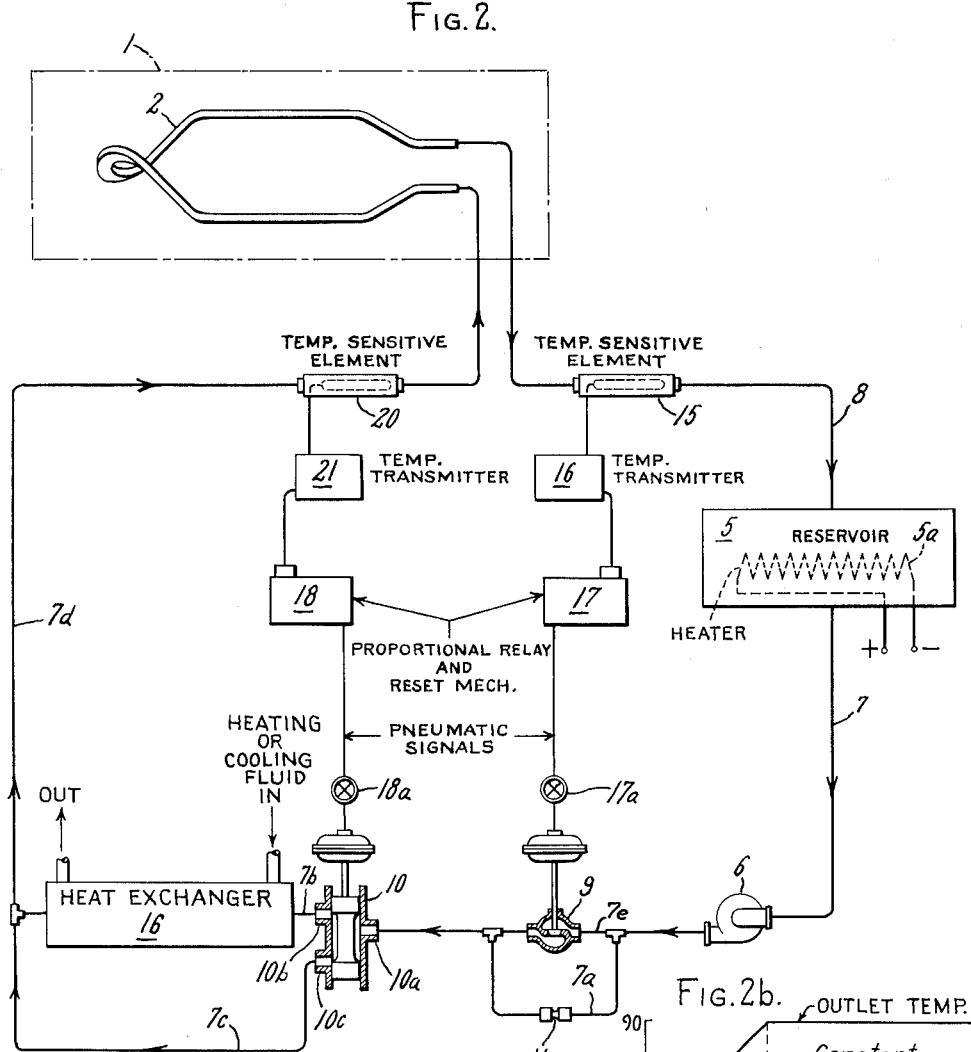

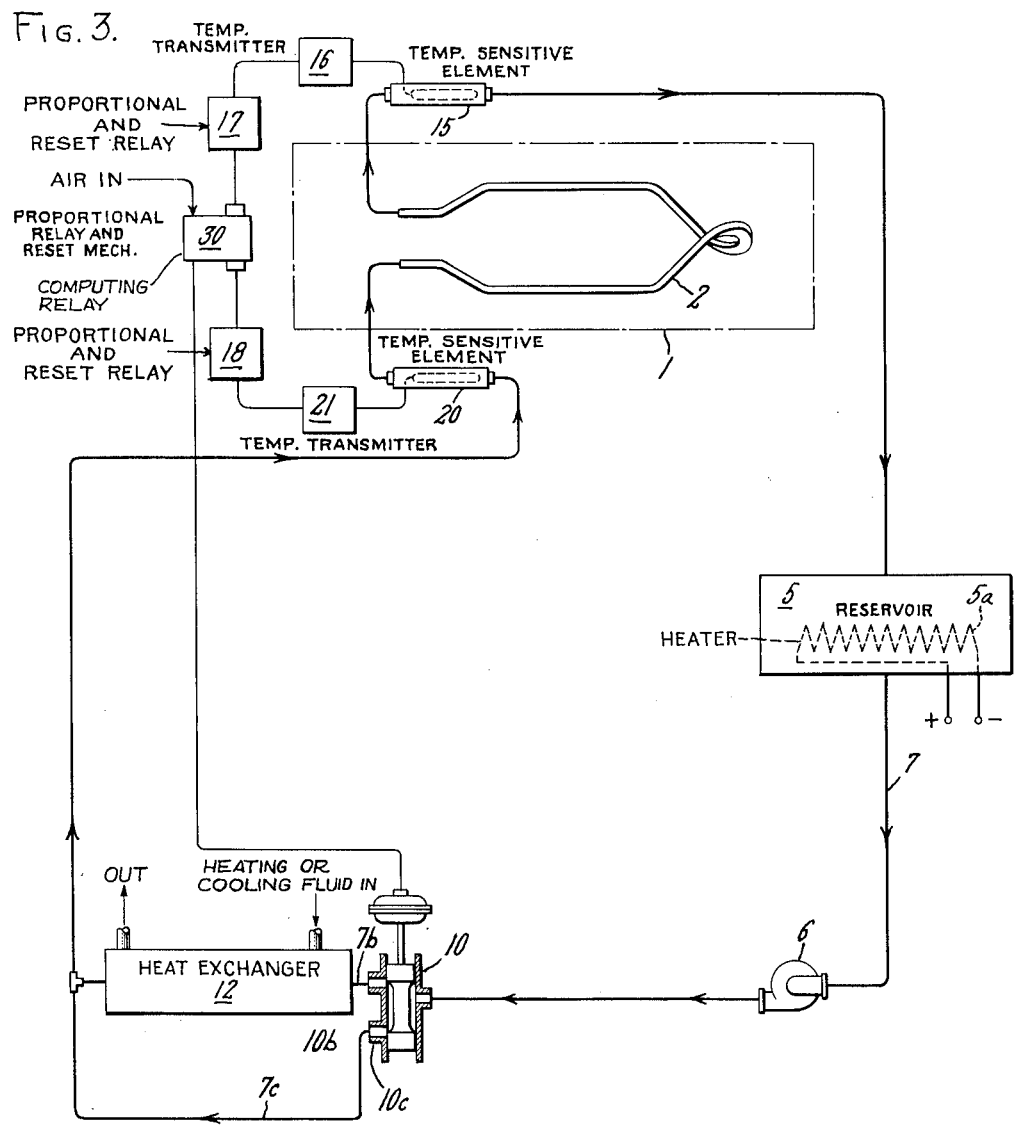
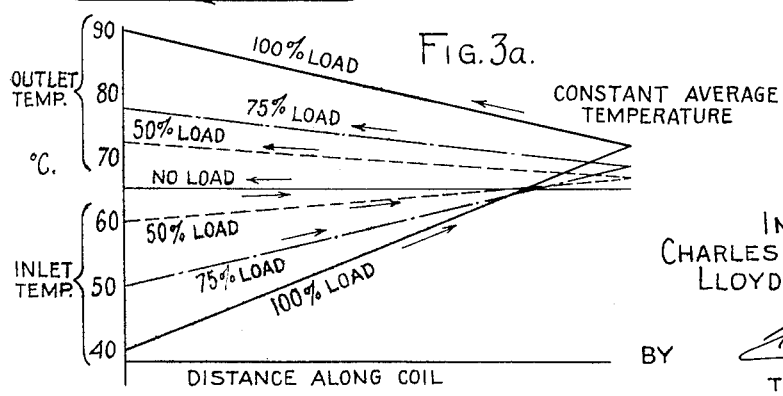

2,975,308
WINDING TEMPERATURE CONTROL SYSTEMS FOR DIRECT-COOLED DYNAMOELECTRIC MACHINES

Charles E. Kilbourne and Lloyd P. Grobel, Schenectady, N.Y., assignors to General Electric Company, a corporation of New York Filed July 24, 1958, Ser. No. 750,750
16 Claims. (Cl. 310—54)

This invention relates to magneto-electric apparatus, such as a dynamoelectric machine which is cooled by bringing fluid coolant into direct contact with the conductors comprising the winding, particularly to a stator winding cooled by a liquid-cooling system separate from the hydrogen gas heretofore used to cool large generators.

A large generator cooling system employing liquid in direct heat exchange relation with the stator winding is disclosed in United States Patent No. 2,695,368, issued November 23, 1954 to C. E. Kilbourne and assigned to the assignee of the present invention. In such a system, the liquid is supplied to the interior of the winding from a header through insulating tubes which are sealed from the cooling gas circulating in the machine.

While a liquid-cooling system of this type has proved very effective in reducing the temperature of the winding, the winding coils are subject to large changes in temperature when the load on the generator is varied. The temperature of the coils vary accordingly, with the result that substantial thermal expansion and contraction of the conductors takes place during load changes. This thermal expansion and contraction of the conductors tends to reduce the life of the insulation, by reason of the relative bending, twisting, and rubbing action produced between the conductor and its insulation, and between the insulation and the laminated magnetic core of the machine. If this variation in temperature to which the coils are subjected upon variation in load can be minimized, the winding will have a significantly longer trouble-free life, with the result that increased reliability and a substantial cost saving can be realized over the life of the generator.

Accordingly, it is an object of this invention to substantially increase the life of the winding of a direct-cooled generator or similar magneto-electric device by reducing the temperature differentials to which the winding is subjected under varying load conditions.

A further object is to provide a coolant temperature control system for a direct-cooled generator winding which reduces the mechanical stresses imposed on the insulation due to differential thermal expansion, by maintaining the coils and their insulation at a substantially constant average temperature, under varying load conditions.

A further object is to provide a direct-cooled winding temperature control system in which the local winding temperatures are maintained substantially constant when the generator is operating above a predetermined minimum load.

A still further object is to maintain the winding of a liquid-cooled generator at substantially constant local temperatures when the generator is operating above a predetermined load, and to minimize the temperature differentials to which the winding is subjected when the generator drops below this load.

Still another object is to provide a direct-cooled winding temperature control system in which either or both the coolant inlet temperature and the coolant outlet temperature may be regulated, by various means, whereby the temperature differentials to which the winding is subjected may be reduced, or constant local temperatures may be maintained throughout the winding by producing a constant differential between the coolant inlet temperature and outlet temperature.

Other objects and advantages will become apparent from the following description, taken in connection with the accompanying drawings in which:

Fig. 1 illustrates a winding temperature control system for a liquid-cooled generator in accordance with the vention which varies both the rate of flow of coolant and the temperature thereof;

Fig. 1a is a cross-section of one of the insulated conductor bars of the direct-cooled generator;

Fig. 1b is a diagram illustrating the local temperatures along the length of a single coil of the system of Fig. 1, at various load conditions;

Fig. 1c is a diagram of the variation of inlet and outlet temperatures as load changes;

Fig. 2 represents a system capable of maintaining the inlet and outlet coolant temperatures essentially constant over most of the operating range of the generator;

Fig. 2a is a diagram illustrating, at various load conditions, the variation of local temperature along the length of the coil when the system disclosed in Fig. 2 is arranged to maintain constant coolant inlet temperature;

Fig. 2b illustrates the variation of coolant inlet and outlet temperature as a function of load change, with the system of Fig. 2.

Fig. 3 is a modified arrangement in which the temperature to which the coils are subjected under varying load conditions is maintained at a substantially constant average value; and Fig. 3a is a diagram illustrating, at various load conditions, the local temperatures along the length of a coil with the system of Fig. 3.

Generally stated, the invention is practiced by controlling either or both the temperature of the liquid coolant supplied to a "direct-cooled" generator winding and the rate of flow of coolant, so as to reduce the temperature variations of the winding coils as the load varies.

Referring now to the drawings, Fig. 1 schematically illustrates an armature coil 2 located in a generator housing 1. Coil 2 is merely one coil of the generator winding and is made up of a plurality of lightly insulated hollow strands 3 (Fig. 1a) surrounded by main or ground insulation 4. Liquid coolant, such as a suitable oil or purified water, is supplied to the armature winding 2 from a reservoir 5. A pump 6 receives the fluid from the reservoir through conduit 7 and pumps it to the generator winding by way of the conduits 7a, 7b, 7c, 7d, and 7e. Conduit 7d is interconnected to armature coil 2 through suitable electrical insulating tubes (not shown). A liquid-cooled generator assembly including such conduit means for supplying coolant to the armature coil 2 is more completely disclosed in the aforementioned Kilbourne Patent 2,695,368. The spent coolant is returned from coil 2 to tank 5 through outlet conduit 8.

The rate of flow of coolant through inlet conduit 7e to coil 2 is controlled by regulating valve 9, which controls the amount of fluid supplied to coil 2 in accordance with the outlet temperature of the windings, as will be more particularly noted in the description of the control system hereinafter. A bypass conduit 7a around throttle valve 9 provides a predetermined minimum flow of coolant to coils 2 when valve 9 is closed, insuring that some coolant is supplied to the coil 2 at all times to provide the minimum fluid flow required to operate the temperature-sensitive elements, when valve 9 is closed. This flow may, for instance, be on the order of 25 gallons per minute in a 150,000 kw. liquid-cooled generator. This minimum flow is necessary in order to effect adequate response of the temperature responsive devices to the coil temperature, since the liquid temperature at 15 will obviously not reflect the temperature of the conductor if there is no flow. Orifice 11 in conduit 7a determines this minimum rate of flow of coolant around throttle valve 9.

The temperature of the coolant directed to the inlet of coil 2 is regulated in accordance with the setting of a proportioning valve 10. Valve 10 performs this function by dividing the fluid flowing into valve inlet 10a between conduits 7b, 7c communicating with outlets 10b, 10c respectively of valve 10. Located in conduit 7b is a heat exchanger 12 which may be arranged to either heat or cool the coolant flowing therethrough. The coolant flowing in conduit 7c bypasses exchanger 12 and recombines with that portion flowing through conduit 7b to provide coolant at the required temperature in conduit 7d leading to winding 2. Basically, the positioning of valve 10 is regulated in accordance with the temperature of the coolant in inlet conduit 7d. A suitable heating fluid such as steam or hot water may be supplied to the heat exchanger 12 when it is desired to "pre-heat" a cold generator, before starting. Thus the coils can be gradually brought up to desired operating temperature, at a sufficiently slow rate as to minimize the local differential temperature effects produced.

Since the coolant fluid is simply a carrier medium for receiving heat or B.t.u.'s from the coils and discharging this heat as it moves along in the fluid circuit through the reservoir, pump, and heat exchanger, it will be appreciated that both the regulating valve 9 which controls the quantity of fluid flowing and the valve 10 with its associated heat exchanger are methods of regulating the amount of heat which can be removed from the winding coils in a unit of time. The first means, regulating valve 9, affects the quantity or mass of fluid flowing in a unit time and since the heat carrying capacity is a function of the quantity of fluid flowing, it can be seen that the regulating valve 9 will vary the heat flow per unit of time. The second means consists of valve 10 and the associated heat exchanger. Assuming a constant flow rate of fluid, the amount of heat taken out of the total flow by heat exchanger 12 will depend upon the position of the proportioning valve 10. Thus with a constant flow, varying the amount of heat taken out of the total flow will also vary the amount of heat which may be removed from the winding coils in a unit of time. It is seen, therefore, that these two means described both affect the quantity of heat removed in a unit of time. It can be appreciated that the overall effect of either of these two means may be different on the total system, and that the two means affect one another in accordance with a differential relationship. For example, an increase in the flow rate which is not accompanied by a change in position of valve 10, will result in a larger amount of fluid flowing through conduit 7b and the heat exchanger which in turn will likewise increase the cooling effect of the coolant fluid and will magnify the cooling effect brought about by increasing the flow rate. The correlation between the valves 9 and 10 is brought about by the arrangement of the temperature measuring elements and the proportional and reset relays.

The control mechanism for regulating throttle valve 9 operates jointly in accordance with a signal indicating the load imposed on the generator and with a signal indicating the outlet temperature of the coolant to maintain the outlet temperature constant when the generator is operating above a predetermined load condition. The outlet temperature is maintained constant, through a predetermined load range, by controlling the flow through valve 9 in response to signals generated by these joint means. In order to quickly anticipate a change in coil temperature brought about by a change in load, the generator load signal causes the flow to be controlled through valve 9 so that the quantity of fluid flowing through the windings per unit of time is proportional to the electrical losses in the windings, which of course are a function of load. The signal is furnished by a load index control element 25 which may be, for example, a current responsive device supplying a pneumatic signal proportional to electric current delivered to the load circuit 27. That is, when the load drops, the quantity of coolant admitted to the coils 2 is reduced by valve 9 so that the heat generated by the coils is sufficient to maintain the outlet temperature of the coolant constant at a desired value. This proportional change in load and coolant flow functions very effectively at loads above approximately 40% of rated capacity. As illustrated in Fig. 1c, in this range the inlet temperature is maintained constant by the setting of valve 10. At loads below 40%, the heat generated by the electrical losses in the coils would not be sufficient to raise the outlet temperature of the coolant to the previously maintained constant level, if the inlet temperature were held constant. Thus the generator load signal effects a rapid or "coarse" adjustment to maintain the outlet temperature constant.

The positioning of the flow control valve 9 is effected jointly in accordance with an integrated signal indicating the temperature of the coolant in the outlet conduit 8 and the load imposed on the generator. In order to provide a "fine" adjustment for regulating the throttle valve 9 to maintain outlet temperature constant, a temperature sensing bulb 15 is located in outlet conduit 8. The temperature bulb 15 is part of a temperature transmitting mechanism 16, which produces a pneumatic signal in accordance with the temperature change and supplies it to the proportional relay and reset mechanism 17. This signal is combined with a pneumatic signal from the load index control element 25 in the proportional relay and reset mechanism 23, which in turn transmits a resultant pneumatic signal to the actuating diaphragm 9a of the throttle valve 9.

The specific details of these mechanisms are not important to an understanding of the present invention, but it may be noted that a number of standard control devices may be used. For instance, a temperature transmitting mechanism of the type including bulb 15 and transmitter 16 is marketed by the Bailey Meter Company as a Type KT1310A, Model A42 Temperature Transmitter. The proportional relay and reset mechanisms 17 and 23 are also a standard device, for instance that marketed by the Bailey Meter Company as a Type 535750CA1 "Mini-Line Relay, Proportional and Reset." The load responsive element 25 may be a current responsive device, such as that marketed by Hagan Chemicals and Control, Inc. as a current transmitter, A.C. type P-400-1.

The fluid flowing through valve 9 is apportioned by valve 10 between conduit 7c and heat exchanger 12, to provide fluid at a constant temperature to the inlet of the coil 2. The positioning of valve 10 is made responsive to inlet temperature by means of a temperature-sensing bulb 20 located in conduit 7d, temperature transmitter 21 (which may be a device similar to transmitter 16), and a proportional reset mechanism 22, of the type represented at 17, as described above. These mechanisms 20, 21, 22 are correlated to tranmit a pneumatic signal to diaphragm 10d to regulate the position of valve 10 so that an increase in the coolant inlet temperature results in directing more of the fluid entering inlet 10a through the cooler 12 to reduce the temperature of the coolant to the desired constant value.

As previously mentioned the foregoing control mechanisms maintain the inlet and outlet temperature of winding 2 substantially constant at loads ranging from approximately 40% load to full load. At loads under 40%, the heat generated in the coils may not be sufficient to raise the outlet temperature of the coolant to the desired constant temperature.

To minimize the drop in coolant outlet temperature, so as to prevent subjecting the coils to an appreciable thermal change and resultant thermal stresses when the load on the generator drops below 40%, an additional control mechanism, the "proportional reset mechanism" 24, is provided to modify the operation of the previously described system. This additional control receives the outlet temperature signal from transmitter 16 and functions to adjust the setting of the proportional relay mechanism 22 so that, below 40% load, instead of maintaining a constant inlet temperature, the inlet temperature is caused to increase by an amount equal to approximately one-half the drop in the outlet temperature of the coolant that would otherwise occur due to the reduced amount of heat generated by the coils at the reduced load. The net effect of this arrangement is to raise the inlet temperature an amount roughly equal to the drop in outlet temperature at the reduced load, and thus maintain a substantially constant average temperature. It will be appreciated that when the inlet temperature is permitted to rise by an amount equal to one-half the drop that would occur otherwise in the outlet temperature at the reduced load, the outlet temperature of the coolant, and thus the temperaure change experienced by the coils, is reduced by about one-half.

This additional control mechanism consists of the proportional relay mechanism 24 (which may also be a Bailey Meter Company "Mini-Line Relay, Proportional and Reset," Type 535750CA1), which transmits a modifying signal to the relay mechanism 22, to change the setting of valve 10 in accordance with a change in outlet coolant temperature. This proportional relay mechanism 24 is thus responsive to the temperature of the outlet coolant, by reason of its connection to temperature transmitter 16 as shown in Fig. 1, and is so set that when the outlet coolant temperature drops below a predetermined value (for instance 85° C.), a pneumatic signal is delivered to relay 22 to adjust the setting of the valve 10 so as to vary the coolant inlet temperature in proportion to the drop in temperature of the outlet coolant temperature.

The operation of the system of Fig. 1 will be seen from the following. With the generator 1 operating at full load, coolant from reservoir 5 is circulated by pump 6 through valves 9 and 10 to the inlet of coil 2. The desired inlet temperature, for example 40° C., is maintained by the adjustment of valve 10, which bypasses a variable amount of coolant around heat exchanger 12. The temperature transmitting mechanism 21 and reset mechanism 22 are responsive to the temperature in inlet conduit 7d, as detected by bulb 20, to adjust the setting of valve 10 to obtain the desired inlet temperature.

Likewise, the outlet temperature is maintained at, for example a constant 90° C., by the joint operation of (1) the transmitter 16 and relay mechanism 17 in response to temperature sensitive bulb 15 in outlet conduit 8, and (2) the transmitter 25 and relay mechanism 23, in response to load changes. The positions of valves 9 and 10, as illustrated in Fig. 1, will remain constant when the generator is operating at full load.

Upon a drop in load on the generator, the outlet temperature drops and temperature sensitive bulb 15 signals temperature transmitting mechanism 16 and relay mechanism 17, which in turn emits a signal pressure to relay mechanism 23, where it is combined with the signal from element 25, and the resultant signal controls diaphragm 9a to move valve 9 in the closing direction and reduce the rate of flow through conduit 7. The reduced flow through valve 9 and inlet conduit 7b to coil 2 is proportional to the reduction in heat generated by coil 2, so that the reduced quantity of coolant being circulated is raised to the desired constant outlet temperature, as determined by the outlet temperature control mechanism 15, 16, 17.

By maintaining the rate of coolant flow proportional to the heat input into the coolant, it can be seen that the outlet temperature of the coolant can be maintained constant so long as sufficient heat is generated in the generator. Between some minimum load, for instance 40%, and full load, the heat generated by the coil 2 will usually be sufficient to maintain the temperature of the coolant at the desired value, as shown in Fig. 1c.

Below approximately 40% load, the heat generated by coil 2 may not be sufficient to raise the temperature of the coolant to the desired constant outlet temperature. Therefore, in the zero to 40% load range, valve 9 is completely closed and the coolant supplied to the coils is only that minimum quantity which flows through restricted bypass conduit 7a. At these reduced loads, the proportional relay mechanism 24, which is responsive to the reduced outlet coolant temperature, directs a pneumatic signal to relay mechanism 22 to adjust the setting of valve 10 to direct less coolant through heat exchanger 12 and thereby raise the temperature of the coolant in inlet conduit 7d. Relay mechanism 24 adjusts the setting of relay 22 to maintain the inlet temperature constant at some higher value than that maintained when the generator is operating above 40% load. The increased inlet temperature of the coolant results in a proportionally higher coolant and coil outlet temperatures. The relay mechanism 24 will be suitably adjusted so the rise in inlet temperature is equal to approximately one-half the drop in outlet temperature that would have occurred at the low load condition if the inlet temperature was maintained at a constant 40° C. For example, at 30% load the expected drop in outlet temperature might be 18° C. (a drop from 90° C. to 72° C.), but this drop is reduced by one-half (to 81° C.) by raising the inlet temperature 9° C. to 49° C. Thus the average coil temperature is held constant.

The variation in temperature along the length of the coil at various load conditions can be seen diagrammatically in Fig. 1b. It will be understood that the left-hand side of the diagram represents the right-hand side of the coil in Fig. 1 (that side of the coil at which the fluid enters and leaves); while the extreme right-hand side of the diagram represents the midpoint in the length of the coil as seen at the left of Fig. 1. With the above-described system, it will be appreciated that in the major portion of the normal operating range, the local temperature changes to which the conductors are subjected are reduced to zero, or at least substantially minimized. Specifically, the variation in inlet and outlet temperature may be as represented in Fig. 1c.

If the generator is normally operated above 40% load, or if the temperature drop below 40% load is not critical, a system as disclosed in Fig. 2 can be used. This arrangement is generally similar to that of Fig. 1, with the exception that there is no adjustment for modifying the setting of the inlet temperature responsive mechanism to adjust the setting of valve 10 when the generator operates below 40% of full load. Likewise, there is no generator load index signal provided to act in conjunction with the outlet temperature control signal.

The operation of the system shown in Fig. 2 may be in the following manner.

Fig. 2a illustrates diagrammatically operation with constant inlet temperature, effected by opening the valve 18a in the signal line from the relay 18 and actuating the valve 17a in the signal line from the relay 17 so as to hold valve 9 in wide open position. The system will now maintain constant inlet temperature, and the discharge temperature will progressively increase as the load increases. At no load, there will be no heat generated in the winding and the coolant will remain at constant temperature throughout the coil, as indicated by the "no load" curve in Fig. 2a. At 100% load, the coolant inlet temperature will be 40° C. and will, along the length of the coil, increase progressively to the maximum outlet temperature of 90° C. At a reduced load, for instance represented by the 75% load curve in Fig. 2a, the maximum discharge temperature may drop to about 68° C., as shown.

Fig. 2b illustrates the operation of the system of Fig. 2 when both inlet and outlet temperature are maintained constant. This is effected by putting both the automatic valves 9 and 10 into operation. The heat exchanger control valve 10 now operates to keep inlet temperature constant; and the flow rate control valve 9 operates to keep coolant discharge temperature constant. As noted above in connection with Fig. 1b, there will be a certain minimum load below which the heat generated in the coils is not sufficient to maintain the desired constant inlet and outlet temperatures. In Fig. 2b, this minimum load is again represented by the 40% condition. Above this load, the system operates as outlined above to keep both inlet and outlet temperature constant. Below this load, the outlet temperature drops to the constant inlet temperature, as shown by the upper curve. In the range below 40% load, the flow control valve 9 is completely closed, and the rate of coolant flow is that determined by the restricted bypass 7a.

If it is considered desirable to maintain a constant average coil temperature over the full range of operating conditions of the generator, the modification disclosed in Fig. 3 can be employed, which gives essentially the same method of operation as the arrangement of Fig. 1, when operating below 40% load. The modification disclosed in Fig. 3 includes the valve 10 located in inlet conduit 7 which, like that disclosed in Figs. 1 and 2, divides the coolant received from inlet conduit 7 between bypass conduit 7c and conduit 7b leading to heat exchanger 12. The inlet temperature of the coolant is sensed by bulb 20, which has temperature transmitting mechanism 21 and proportional relay 18 to emit a signal pressure in accordance with the coolant inlet temperature. The outlet temperature of the coolant is measured by temperature sensitive bulb 15 located in outlet conduit 8d, and temperature transmitter 16 and proportional relay 17. Transmitters 16 and 21 and the proportional and reset relays 17, 18 are similar to the like-numbered elements in Fig. 1.

The signals from transmitters 16, 21 are combined in a computing type relay 30, and the output signal pressure therefrom is transmitted to three-way valve 10 to adjust the setting thereof to regulate the inlet temperature of the coolant. Relay 30 senses the coolant inlet and outlet temperature, averages them, and positions valve 10 so that a constant average temperature between the inlet and outlet of coil 2 is maintained. This relay 30 may, for instance, be of the type known as a Bailey Meter Company Type 5315750CA1 "Mini-Line Computing Relay." It is to be noted that throttle valve 9 is not used in the arrangement of Fig. 3. Instead a substantially constant quantity of coolant is supplied to the coil inlet by pump 6.

The operation of the system of Fig. 3 will be seen from the following.

Considering first that the generator is operating at full load, a generally similar "100% load" curve as disclosed in Figs. 1b, 2a is found in Fig. 3a. However, at lower loads, when the outlet temperature drops, the outlet temperature bulb 15 senses this and the temperature transmitting mechanism 16 transmits a signal through proportional and reset relay 17 to relay 30 to change the setting of valve 10 to increase the amount of fluid bypassing the heat exchanger 12 and raise the inlet temperature. The computing relay 30 is adjusted so that, for a given drop in outlet temperature, the inlet temperature will be raised one-half this amount, with the result that the net drop in the outlet temperature is reduced by one-half. The coil temperatures at various loads is shown in Fig. 3a. Thus, the average temperature of the coil is maintained substantially constant, and the local temperature variations to which the conductors are subjected are reduced by approximately one-half, thus reducing the mechanical stresses set up in the insulation due to differential thermal expansions and contractions of the conductors under varying load conditions.

Thus it can be seen that the invention provides temperature control arrangements in which the mechanical stresses on the coil insulation can be substantially reduced by minimizing the local temperature changes experienced by the conductors because of generator load changes. The temperature of the coil and insulation is regulated by controlling the flow and temperature of the coolant supplied to the coil under predetermined load conditions. The thermal changes experienced by the insulation depend on which of the foregoing systems is used and at what load the generator is operating. Any of the disclosed systems will result in longer life for the coil insulation, through the substantial reduction in mechanical stressing of the insulation due to differential thermal expansion of the conductors.

While the temperature control systems described above are principally intended for controlling the dissipation of heat generated by electrical losses in the generator conductors during normal operation, these arrangements also have value in permitting preheating of the generator coils before beginning operation. It will of course be understood that when the generator is cold there will be a substantial amount of differential thermal expansion as the conductors warm up in coming to normal operating temperature. If the machine is operating at a high speed during this thermal expansion process, the mechanical forces imposed on the conductors and their insulation can be severe. Accordingly, the life of the insulation can be still further extended by very carefully pre-warming the conductors before beginning normal speed operation of the rotor. This may be accomplished either by supplying a heating fluid to the heat exchanger 12 so as to warm the circulating coolant fluid, or by providing the reservoir 5 with an electric heating coil 5a, or the equivalent.

With such an arrangement, heated fluid can be circulated through the direct-cooled conductors of the generator to bring them substantially to normal operating temperature before the rotor is brought up to normal operating speed. It will also be observed that thus supplying heat to the coils of the generator stator will, if the pre-heating process is continued long enough, cause heating by conduction and convection to the rotor conductors, so that they also share the benefits of pre-heating even though the conductors thereof may not be supplied with direct heat transfer as in the case of the stator conductors. Thus, by appropriately pre-heating only the stator conductors, the differential thermal expansions and contractions to which the conductors of both rotor and stator are subjected over the entire operating range of the generator may be minimized or substantially eliminated.

It will be appreciated that the structures described specifically herein are intended to be illustrative only, and actual embodiments of the invention may take many forms. For example, the temperature signal transmitting and relay mechanism may take many forms and are not limited to the specific instrumentation referred to herein. Furthermore, the coil temperatures mentioned herein corresponding to various loads are only by way of example. Also, the load index control element 25, which, as disclosed in Fig. 1 is responsive to the generator current, could be replaced by a device responsive to steam flow to the turbine driving the generator, or other conditions which vary as a function of load. While the systems described specifically herein employ liquid coolants, the invention may also be applicable to gaseous coolant fluids, at suitable pressures and densities so as to have the desired thermal capacity.

It is, of course, intended to cover by the appended claims all such modifications as fall within the true spirit and scope of the invention.

What we claim as new and desire to secure by Letters Patent of the United States is:

1. Temperature regulating mechanism for a direct-cooled winding of a magneto-electric device having at least one coil surrounded by insulation and defining at least one passage means within the insulation for coolant fluid, a source of fluid coolant, inlet conduit means supplying coolant from said source to said passage, and discharge conduit means for removing spent coolant from the passage, the regulating mechanism comprising heat exchanger means for varying the temperature of the coolant fluid supplied to the inlet conduit, means responsive to the inlet temperature of coolant supplied to the coil cooling passage for controlling said heat exchanger means to keep the coil inlet temperature substantially constant, means regulating the rate of coolant supply to the inlet conduit, and means responsive to coil coolant outlet temperature for adjusting said rate control means to maintain coil outlet temperature substantially constant.

2. In a direct-cooled magneto-electric device having a winding comprising at least one coil surrounded by insulation and defining at least one passage within the insulation for receiving a fluid coolant, a source of cooling fluid, means for supplying coolant from said source to the coil cooling passage and means for draining spent coolant from the coil, the combination of means for maintaining the local temperature of the coil at each point along the length of the coil substantially constant including means responsive to coil inlet temperature for maintaining constant the temperature of the coolant supplied to the coil, and means responsive to coil outlet temperature for altering the rate of flow of coolant to maintain coil outlet temperature substantially constant.

3. Temperature control means for a direct-cooled magneto-electric device winding in accordance with claim 2 and including means for increasing the constant temperature maintained by the inlet temperature control means and reducing the constant outlet temperature maintained by the outlet control means when the load on the device drops below a preselected value.

4. Electric coil temperature control means in accordance with claim 2 and including means for progressively increasing the temperature maintained by the coolant inlet temperature control means as a function of decreasing load.

5. In temperature regulating apparatus for the winding of a magneto-electric device having at least one coil comprising a conductor surrounded by insulation and having at least one passage for directing a coolant fluid in heat transfer relation with the conductor, the combination of first means for supplying a fluid coolant at substantially constant temperature to the inlet of said coil cooling passage, second means for regulating the rate of supply of coolant fluid as a function of coolant outlet temperature, and third means increasing the rate of supply of coolant as a function of increasing electrical losses in the coil, said second and third means being arranged to cooperate so that the third means anticipates an adjustment by the second means, whereby outlet temperature is maintained substantially constant.

6. In a direct-cooled winding for a magneto-electric device having at least one coil surrounded by insulation and defining a passage for receiving a fluid coolant, a source of fluid coolant, inlet conduit means interconnecting said source and passage, and outlet conduit means for draining spent coolant fluid from the passage, the combination of coolant temperature control means including both coil inlet and outlet temperature responsive devices for maintaining the local temperature of the coil at each point along its length substantially constant under varying load conditions in a normal operating range, whereby temperature changes in the coil are minimized to reduce differential thermal expansion and contraction.

7. A magneto-electric device with a winding including at least one coil, insulation surrounding said coil, duct means for coolant fluid within the insulation, a source of coolant, inlet conduit means connecting the source with said duct means, outlet conduit means for draining the coolant from the cooling duct, first valve means for controlling the rate of flow of coolant through the inlet conduit, means for holding substantially constant the temperature of the coolant in the inlet conduit including a heat exchanger and second means for regulating the cooling effect of the heat exchanger, means responsive to coolant temperature in the inlet conduit for controlling said second means, and third means responsive to the temperature of the coolant in the outlet conduit for positioning the first valve means to adjust the flow of coolant to maintain the coolant outlet temperature substantially constant.

8. In a magneto-electric device having a winding including at least one coil surrounded by insulation and defining a passage for receiving coolant fluid, a source of coolant fluid, inlet conduit means connecting said source with said passage, and outlet conduit means for removing the coolant from the coil, the combination of means controlling the temperature of the coolant in the inlet conduit including a heat exchanger and first means controlling the heating or cooling effect of the heat exchanger, second means responsive to coolant temperature in said inlet conduit, third means responsive to coolant temperature in the outlet conduit, and relay means responsive to signals from said second and third temperature responsive means for adjusting the setting of said first control means to maintain a substantially constant average coil temperature under varying load conditions.

9. In a winding for a magneto-electric device including at least one insulated coil member having a passage inside the insulation for receiving a fluid coolant, a source of fluid coolant, inlet conduit means interconnecting said source and passage, and outlet conduit means for draining the fluid from the passage, the combination of first valve means in the inlet conduit for controlling the rate of flow of coolant to the coil, second means for controlling the temperature of the coolant in said inlet conduit, means responsive to the temperature of the coolant in the inlet conduit for regulating the temperature control means to maintain a constant coolant inlet temperature when the machine is operating above a predetermined intermediate load, means responsive to coolant temperature in the outlet conduit for regulating said valve means to control the rate of coolant flowing therethrough in proportion to load when operating above said intermediate load, and relay means responsive to a drop in load below said intermediate load for varying the setting of said second means to raise the coolant inlet temperature in proportion to the drop in outlet coolant temperature corresponding to the drop in load, whereby a substantially constant average temperature is maintained throughout the coil when operating at a load below said intermediate load.

10. A controlled-temperature winding for a magneto-electric device including a coil having coolant conduit means disposed within the main coil insulation, a source of coolant fluid, inlet conduit means interconnecting the source of fluid with the coolant conduit in the coil, outlet conduit means interconnecting the source and the outlet portion of the coil, first valve means for controlling the rate of fluid flow in the inlet conduit, means for regulating the coolant fluid inlet temperature including a heat exchanger and second means for controlling the cooling effect of the heat exchanger, third means responsive to coolant temperature in said inlet conduit for regulating the setting of said second means to regulate the inlet temperature of the coolant, said third means including temperature sensing means responsive to coolant temperature in said inlet conduit and fourth temperature transmitting and relay mechanism responsive to coolant inlet temperature for adjusting the setting of said second means, fifth temperature sensitive means responsive to coolant temperature in the outlet conduit for controlling the setting of said first valve means, said fifth means including means responsive to coolant temperature in said outlet means and sixth temperature transmitting and relay mechanism responsive to the coolant outlet temperature for controlling the setting of the first valve means to adjust the rate of flow of coolant through the coil to maintain a substantially constant outlet temperature when operating between full load and a predetermined intermediate load, means responsive to an operating condition of the magneto-electric device to adjust the setting of said third means to raise the coolant inlet temperature in proportion to the drop in outlet temperature when the machine is operating below said predetermined load, whereby a substantially constant average temperature in the coil is maintained to minimize stresses set up in the coil due to thermal expansion and contraction.

11. A temperature control system for minimizing stresses caused by temperature variation in the winding of a magneto-electric device comprising a plurality of conduits defined by said winding and in heat transfer relationship therewith, means for circulating coolant fluid through said winding conduits, means for cooling a portion of said coolant fluid, a proportioning valve for varying the portion of the fluid coolant supplied to said cooling means whereby the heat taken from the total coolant fluid by said cooling means may be varied, a flow control valve for varying the flow rate of fluid coolant supplied to the winding conduits, first temperature control means measuring the fluid coolant inlet temperature and supplying an inlet temperature control signal to position the proportioning valve whereby the inlet temperature is maintained substantially constant, second temperature control means measuring the fluid coolant outlet temperature and supplying an outlet temperature control signal to position the flow control valve, whereby the outlet temperature is maintained substantially constant.

12. Winding temperature control system in accordance with claim 11 and including a load sensitive means transmitting a load index control signal in accordance with the load on the windings, and first proportional relay means for combining the outlet temperature control signal with said load index control signal to furnish an integrated outlet signal to position the flow control valve, whereby the outlet temperature is maintained substantially constant.

13. Winding temperature control system in accordance with claim 12 and including second proportional relay means which receives the outlet temperature control signal and which modifies the inlet temperature control signal below a predetermined intermediate load, whereby the inlet and outlet temperatures of the coil are caused to approach a temperature which is substantially the average of the inlet and outlet temperatures which were maintained constant above the intermediate load value.

14. A temperature control system for minimizing stresses caused by temperature variation in the winding of a magneto-electric device comprising a plurality of conduits defined by said windings and in heat transfer relationship therewith, means for circulating coolant fluid through said winding conduits, means for removing a variable amount of heat from said coolant fluid including heat exchanger means and a proportioning valve controlling the heating or cooling effect of the heat exchanger, first temperature control means measuring the fluid coolant inlet temperature and furnishing an inlet temperature control signal, second temperature control means measuring the fluid coolant outlet temperature and furnishing an outlet temperature control signal, computing relay means receiving said inlet temperature control signal and said outlet temperature control signals and supplying a resultant signal to position said proportioning valve whereby a substantially constant average winding temperature is maintained.

15. A temperature control system for minimizing stresses caused by temperature variation in the winding of a magneto-electric device comprising a plurality of conduits defined by said winding and in heat transfer relationship therewith, means for circulating coolant fluid through said winding conduits, means for controlling the amount of heat removed per unit of time by the coolant fluid, first temperature control means measuring the fluid coolant inlet temperature and supplying a first control signal, second temperature control means measuring the outlet temperature and supplying a second control signal, means for modifying said first and second control signals to operate said heat flow control means, whereby overall temperature variations in the winding are minimized.

16. Temperature control system in accordance with claim 15 wherein the heat flow control means includes first heat exchange means to heat and cool the coolant fluid and second flow control means to control the rate of flow of the coolant fluid.

References Cited in the file of this patent

UNITED STATES PATENTS

| | | |
|---|---|---|
| 1,315,996 | Simmon | Sept. 16, 1919 |
| 1,557,387 | Thwing | Oct. 13, 1925 |
| 1,696,612 | Rice | Dec. 25, 1928 |
| 2,695,368 | Kilbourne | Nov. 23, 1954 |
| 2,773,201 | Martin | Dec. 4, 1956 |
| 2,887,593 | Weidemann | May 19, 1959 |

FOREIGN PATENTS

| | | |
|---|---|---|
| 121,005 | Great Britain | Dec. 5, 1918 |
| 687,924 | France | Oct. 16, 1933 |